(12) United States Patent
Zhang

(10) Patent No.: US 12,101,421 B1
(45) Date of Patent: Sep. 24, 2024

(54) ELECTRONIC-DEVICE PROTECTIVE SHELL

(71) Applicant: Yangjiang Ningwo Trading Co., Ltd., Yangjiang (CN)

(72) Inventor: Weixuan Zhang, Yangjiang (CN)

(73) Assignee: Yangjiang Ningwo Trading Co., Ltd., Yangjiang (CN)

( * ) Notice: Subject to any disclaimer, the term of this patent is extended or adjusted under 35 U.S.C. 154(b) by 0 days.

(21) Appl. No.: 18/587,246

(22) Filed: Feb. 26, 2024

(51) Int. Cl.
*H04M 1/02* (2006.01)
*G06F 3/0354* (2013.01)

(52) U.S. Cl.
CPC ....... *H04M 1/0235* (2013.01); *H04M 1/0268* (2013.01); *G06F 3/03545* (2013.01); *H04M 1/022* (2013.01); *H04M 2250/52* (2013.01)

(58) Field of Classification Search
CPC ........ H04M 1/12; H04M 1/04; H04M 1/0235; H04M 1/0268; H04M 1/022; H04M 2250/52; G06F 3/03545; A45C 2011/001; A45C 2011/002; A45C 2011/003; A45C 13/002; A45C 13/008; A45C 11/00
See application file for complete search history.

(56) References Cited

U.S. PATENT DOCUMENTS

| | | | | |
|---|---|---|---|---|
| 10,790,869 B1* | 9/2020 | Loh | | A45C 11/00 |
| D1,006,007 S * | 11/2023 | Weng | | D14/250 |
| 11,870,481 B1* | 1/2024 | Huang | | H04B 1/3888 |
| 2007/0122141 A1* | 5/2007 | Agevik | | F16M 11/242 |
| | | | | 396/419 |
| 2015/0320167 A1* | 11/2015 | Nguyen | | A45F 5/00 |
| | | | | 224/191 |
| 2016/0113368 A1* | 4/2016 | Tu | | A45C 11/00 |
| | | | | 206/45.23 |
| 2023/0102883 A1* | 3/2023 | Chung | | H04B 1/3888 |
| | | | | 455/575.8 |
| 2023/0130700 A1* | 4/2023 | Serna | | F16M 11/22 |
| | | | | 206/45.24 |
| 2023/0148721 A1* | 5/2023 | Lee | | A45C 13/1069 |
| | | | | 224/183 |
| 2023/0235847 A1* | 7/2023 | He | | F16M 11/2021 |
| | | | | 248/276.1 |

FOREIGN PATENT DOCUMENTS

| | | |
|---|---|---|
| CN | 107394837 A | 11/2017 |
| CN | 215187748 U | 12/2021 |
| CN | 218071552 * | 12/2022 |
| CN | 220234738 U | 12/2023 |

* cited by examiner

*Primary Examiner* — Angelica Perez

(57) ABSTRACT

The present invention relates to an electronic-device protective shell including a shell body provided with an accommodating chamber and a camera hole in communication with the accommodating chamber. The accommodating chamber is used for accommodating an electronic device, and the camera hole is used for exposing a camera of the electronic device. A support member is disposed on an outer surface of the shell body, and the support member includes a bracket plate and a camera cover. The bracket plate is rotatably connected to the shell body, and the camera cover is slidable with respect to the bracket plate to cover or expose the camera hole.

9 Claims, 13 Drawing Sheets

ELECTRONIC-DEVICE PROTECTIVE SHELL

TECHNICAL FIELD

The present invention relates to the technical field of phone accessories, and in particular to, an electronic-device protective shell.

BACKGROUND

At present, electronic devices such as mobile phones are gradually becoming indispensable items in people's daily lives. With the technological development of smart phones, an increasing variety of display sizes of the smart phones can be selected, and the types of the phones are also becoming more diverse. Based on screen size, smart phones can be categorized into flat screen phones and foldable screen phones. To prevent pollution and wear on the mobile phone body, consumers typically use protective shells to protect the electronic devices such as smart phones. With a support member provided on the back surface of the protective shell, an included angle is formed between the phone and the horizontal plane when the user uses the phone to read or watch a video, thus allowing the user to watch the phone screen conveniently.

However, in the prior art, the phone camera is directly exposed outside the phone shell and likely to be worn, affecting the service life of the camera. In addition, for the foldable screen phone, a conventional support member is difficult to stably support the phone body with a large weight, causing inconvenient use for the consumer.

SUMMARY

The present invention provides an electronic-device protective shell, resolving the technical problem in the prior art that the camera of the electronic device cannot be protected and the foldable screen phone cannot be supported stably.

To resolve the foregoing problem, the present invention provides the following solution: An electronic-device protective shell is provided, including a shell body provided with an accommodating chamber and a camera hole in communication with the accommodating chamber. The accommodating chamber is used for accommodating an electronic device, and the camera hole is used for exposing a camera of the electronic device. A support member is disposed on an outer surface of the shell body, and the support member includes a bracket plate and a camera cover. The bracket plate is rotatably connected to the shell body, and an external dimension of the bracket plate is slightly smaller than that of the shell body. An outer surface of the shell body is provided with a bracket accommodating groove, and when the bracket plate is accommodated in the bracket accommodating groove, an outer surface of the bracket plate is flush with the outer surface of the shell body. The camera cover is slidable by a push with respect to the bracket plate to cover or expose the camera hole.

Preferably, the bracket plate is provided with a camera exposure hole, and the camera exposure hole corresponds to the camera hole in position. The outer surface of the bracket plate is provided with a U-shaped connecting portion, the camera cover is slidably connected to the U-shaped connecting portion, upper and lower side walls of the U-shaped connecting portion are each provided with a guide groove, and left and right ends of the guide groove are each provided with a limit protruding block. Upper and lower sides of the camera cover are each provided with a flange, left and right ends of the flange are each provided with a notch, the flange is inserted into the guide groove, and the notch is able to accommodate the limit protruding block.

Preferably, the limit protruding block is a semi-circular protrusion, and the notch is a semi-circular groove.

Preferably, a side shell body is provided with a receiving chamber, and a stylus is able to be placed in the receiving chamber on the side shell body.

Preferably, the electronic device is a foldable screen phone, and the foldable screen phone includes an upper folded portion including a first screen and a lower folded portion including a second screen. The upper folded portion is connected to the lower folded portion via a hinge, and the shell body is configured to accommodate the lower folded portion of the foldable screen phone. The protective shell further includes a front protective shell and a side shell body. The front protective shell is configured to accommodate the upper folded portion of the foldable screen phone, and the front protective shell is provided with a hollow window. The side shell body is able to be rotatably opened or closed with respect to the shell body.

Preferably, an inner surface of the shell body is provided with two hinge accommodating grooves, and the two hinge accommodating grooves are distributed at upper and lower ends of the shell body. An inner surface of the bracket plate is provided with two third hinge grooves, and the two third hinge grooves correspond to the two hinge accommodating grooves. A second hinge head is mounted in the third hinge groove, a second hinge seat is mounted in the hinge accommodating groove, and the second hinge head is hinged with the second hinge seat. A back cover plate is laid on the hinge accommodating groove, and a bracket cover plate is laid on the third hinge groove.

Preferably, a second pin shaft is inserted into a hinge joint between the second hinge head and the second hinge seat, a damping sleeve sleeves a periphery of the second pin shaft, and the damping sleeve has one end fixedly connected to the second hinge head and the other end fixedly connected to the second hinge seat.

Preferably, a first hinge seat is also mounted in the hinge accommodating groove, upper and lower ends of the side shell body are each provided with a first hinge head, and the first hinge head is hinged with the first hinge seat. A first pin shaft is inserted into a hinge joint between the first hinge head and the first hinge seat, a torsion spring sleeves a periphery of the first pin shaft, and the torsion spring has one end fixedly connected to the first hinge head and the other end fixedly connected to first hinge seat. The torsion spring applies a force to the side shell body to rotate in a close direction.

Preferably, a first hinge groove and a second hinge groove are provided in the hinge accommodating groove. A plurality of first positioning protrusions are disposed in the first hinge groove, and the plurality of first positioning protrusions are inserted into a positioning hole at a corresponding position of the first hinge seat. A plurality of second positioning protrusions are disposed in the second hinge groove, and the plurality of second positioning protrusions are inserted into a positioning hole at a corresponding position of the second hinge seat. A plurality of third positioning protrusions are disposed in the third hinge groove, and the plurality of third positioning protrusions are inserted into a positioning hole at a corresponding position of the second hinge head.

Preferably, a side of the shell body is provided with a button portion, a bottom of the shell body is provided with a data cable socket, and a side of the camera hole is provided with a first sound transmission hole.

The present invention has the following beneficial effects: The present invention provides an electronic-device protective shell, having the following advantages:

1. The camera cover 5 is slidably disposed on the bracket plate 4, and the user can slide the camera cover 5 left or right on the bracket plate 4, so as to selectively expose or cover the camera of the phone. When using the electronic device to take photos or record audio, the user slides the camera cover 5 to the far right to expose the camera or noise-canceling microphone of the electronic device. When the user does not need to use the function of taking photos or recording audio, he/she slides the camera cover 5 to the far left side, to cover the camera or noise-canceling microphone of the electronic device, so as to protect the camera of the electronic device, preventing pollution and scratch. 2. The external dimension of the bracket plate 4 is arranged to be slightly smaller than that of the shell body 2. A large bracket plate 4 can provide a stable support force for the foldable screen phone. After the first hinge seat 32 and the second hinge seat 45 are mounted in the hinge accommodating groove 26, the back cover plate 27 is laid on the hinge accommodating groove 26, and the bracket cover plate 46 is laid on the third hinge groove 48. The provision of the back cover plate 27 prevents the hinge structure from scratching the phone body. The provision of the bracket cover plate 46 prevents the second hinge head 47 from hindering the bracket plate 4 from being completely accommodated into the bracket accommodating groove 25, satisfying the support performance of the bracket plate 4 while maintaining aesthetics.
3. In a hinge structure between the second hinge head 47 and the second hinge seat 45, the damping sleeve sleeves the periphery of the second pin shaft 452. The damping sleeve increases the rotary friction force between the second hinge head 47 and the second hinge seat 45, allowing the bracket plate 4 to hover at any position within the rotational range, such that the user can adjust the support angle of the bracket plate 4 based on requirements.

The above description is merely an overview of the technical solution of the present invention. To make the technical means of the present invention more comprehensible and implemented in accordance with the content of the specification, the present invention is described in detail below with reference to the preferred embodiments of the present invention and accompanying drawings. The specific implementations of the present invention are described with reference to the following embodiments and accompanying drawings.

BRIEF DESCRIPTION OF DRAWINGS

The accompanying drawings described here are used to provide a further understanding of the present invention, and constitute a part of the present invention. The schematic embodiments of the present invention and their descriptions are used to explain the present invention, and do not constitute improper limitations to the present invention. In the accompanying drawings.

In the accompanying drawings, parts represented by numeral references are listed as follows:
1. front protective shell; 11. hollow window;
2. shell body; 21. button portion; 22. sound transmission hole; 23. data cable socket; 24. camera hole; 25. bracket accommodating groove; 26. hinge accommodating groove; 27. back cover plate; 28. first hinge groove; 281. first positioning protrusion; 29. second hinge groove; and 291. second positioning protrusion;
3. side shell body; 31. first hinge head; 32. first hinge seat; 33. torsion spring; 34. first pin shaft;
4. bracket plate; 41. camera exposure hole; 42. second sound transmission hole; 44. U-shaped connecting portion; 441. guide groove; 442. limit protruding block; 45. second hinge seat; 452. second pin shaft; 46. bracket cover plate; 47. second hinge head; 48. third hinge groove; 481. third positioning protrusion;
5. camera cover, 51. flange; 52. notch; 53. push portion;
2A. second shell body; 25A. second bracket accommodating groove; and 4A. second bracket plate.

DETAILED DESCRIPTION OF THE EMBODIMENTS

The principle and features of the present invention are described with reference to FIGS. 1 to 11, and the examples are only used to explain the present invention instead of limiting the range of the present invention. The present invention is described specifically using examples with reference to the accompanying drawings in the following paragraphs. According to the following descriptions and claims, the advantages and features of the present invention become clearer. It should be noted that the drawings are simplified and made to a non-accurate scale and only used for conveniently and clearly assisting in describing embodiments of the present invention.

It should be noted that when an assembly is "fixed" to another assembly, it may be fixed to the another assembly directly or via an intermediate assembly. When an assembly is "connected" to another assembly, it may be connected to the another assembly directly or via an intermediate assembly. When an assembly is "disposed" on another assembly, it may be disposed on the another assembly directly or via an intermediate assembly. The terms "vertical", "horizontal", "left", "right", and similar expressions used in this specification are solely for explanatory purposes.

Unless otherwise defined, all technical and scientific terms used herein have the same meaning as commonly understood by those skilled in the technical field of the present invention. The terms mentioned herein are merely for describing specific embodiments rather than limiting the present invention. The term "and/or" used herein includes any and all combinations of one or more of the associated listed items.

Embodiment 1

Figure 1:
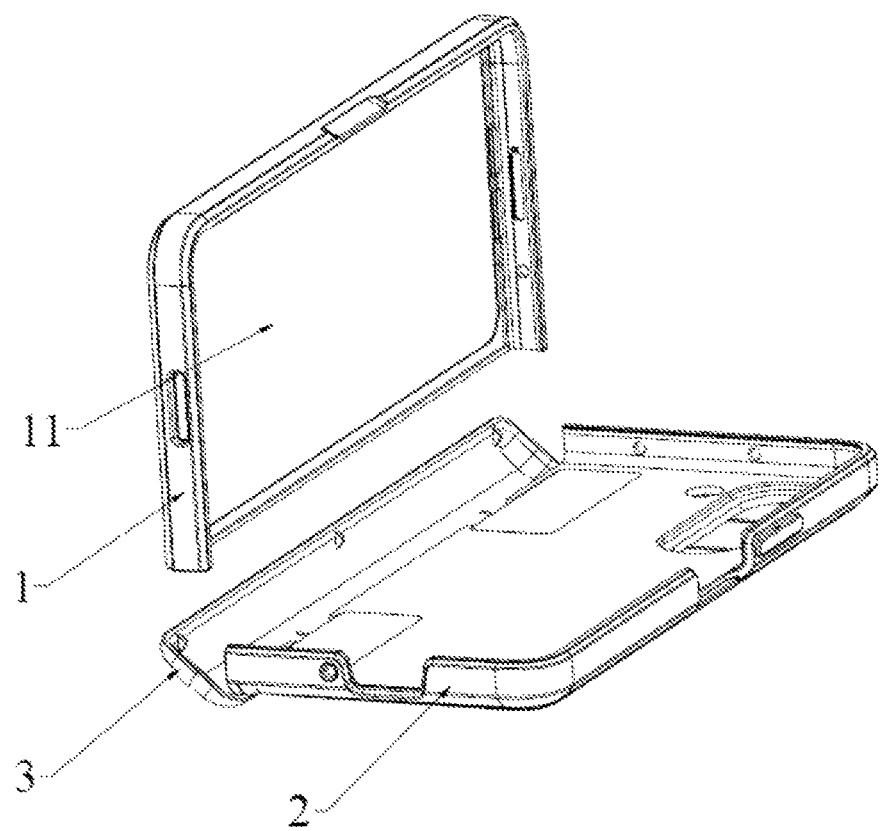
FIG. 1 is a three-dimensional diagram of a foldable-screen phone shell, and also a schematic structural diagram of an included angle between a front protective shell and a shell body being 90°.

As shown in FIG. 1, an electronic-device protective shell is provided. In a case of an electronic device being a foldable screen phone, the foldable screen phone includes an upper folded portion including a first screen and a lower folded portion including a second screen, where the upper folded portion is connected to the lower folded portion via a hinge. Correspondingly, the electronic-device protective shell is used to protect the foldable screen phone. The electronic-device protective shell includes a front protective shell 1, a shell body 2, and a side shell body 3. The front protective shell 1 is configured to accommodate the upper folded portion of the foldable screen phone, and the front protective shell 1 is provided with a hollow window 11. The content displayed on the upper folded portion can be viewed via the hollow window 11. To protect the display screen of the upper folded portion, a screen protection film is disposed on the hollow window 11. When using the protective shell, the user can apply no additional protective film on the upper folded portion, thus facilitating use by the user. The shell body 2 is configured to accommodate the lower folded portion of the foldable screen phone. The side shell body 3 is able to be rotatably opened or closed with respect to the shell body 2. As shown in FIG. 5B, to facilitate the use by the user, the side shell body 3 may be also provided with a receiving chamber, and a stylus is able to be placed in the receiving chamber on the side shell body 3.

Figure 2:
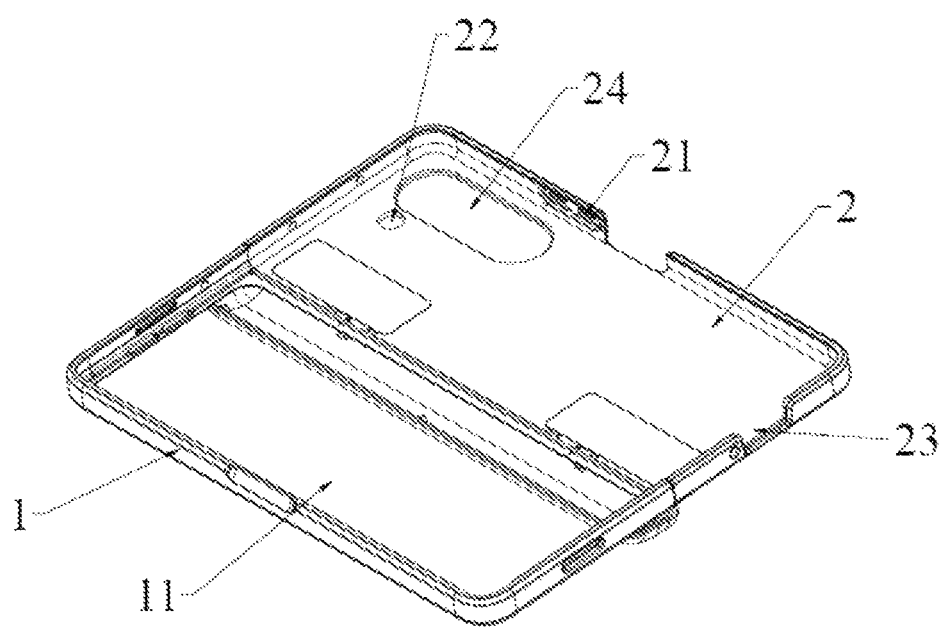
FIG. 2 is a three-dimensional diagram of a foldable-screen phone shell, and also a schematic structural diagram of a front protective shell and a shell body being completely unfolded.

As shown in FIG. 2, the shell body 2 is provided with an accommodating chamber and a sound transmission hole 22 and a camera hole 24 in communication with the accommodating chamber, the accommodating chamber being used for accommodating the lower folded portion of the foldable screen phone. A sound transmission hole 22 is provided on a side of the camera hole 24. The sound transmission hole 22 during use is aligned with a noise-canceling microphone on the foldable screen phone. The camera hole 24 during use is aligned with the camera on the foldable screen phone and used for exposing the camera of the electronic device. A button portion 21 is disposed on a side of the shell body 2, and its bottom is provided with a data cable socket 23.

Figure 3:
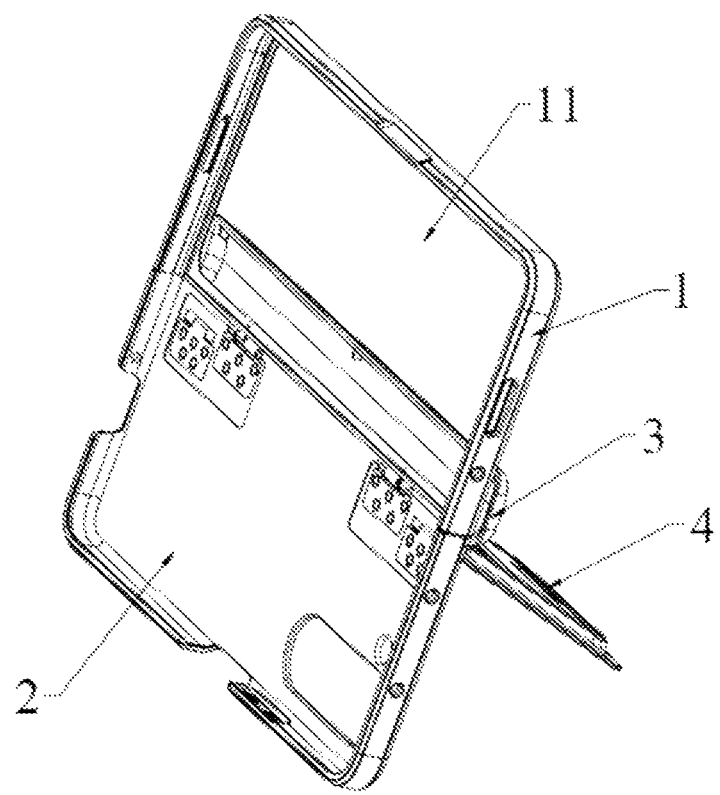
FIG. 3 is a three-dimensional diagram of a foldable-screen phone shell, and also a schematic structural diagram of a bracket plate and a shell body being unfolded at a specified angle.
Figure 4:
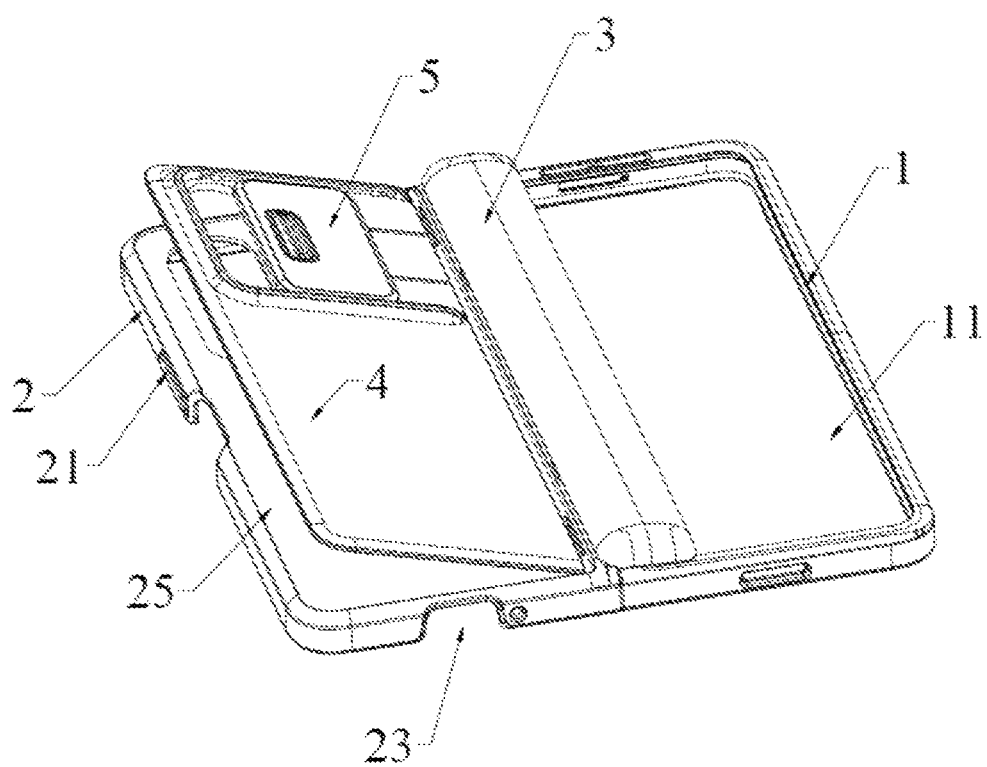
FIG. 4 is a three-dimensional diagram of a foldable-screen phone shell, and also another schematic structural diagram of a bracket plate and a shell body being unfolded at a specified angle.
Figure 5A:
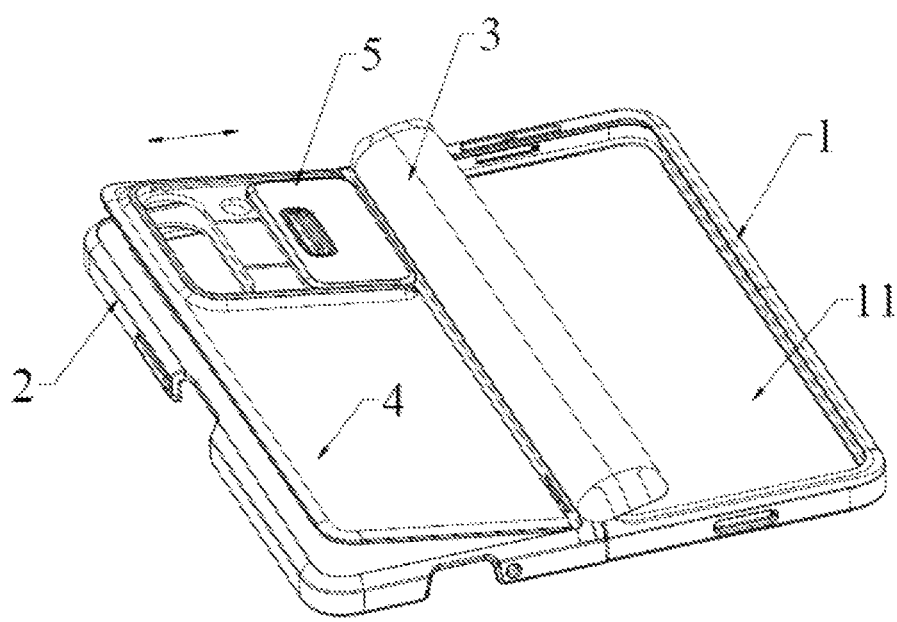
FIG. 5A is a three-dimensional diagram of a foldable-screen phone shell, and also a schematic structural diagram of a camera cover being slid to the far right end.
Figure 5B:
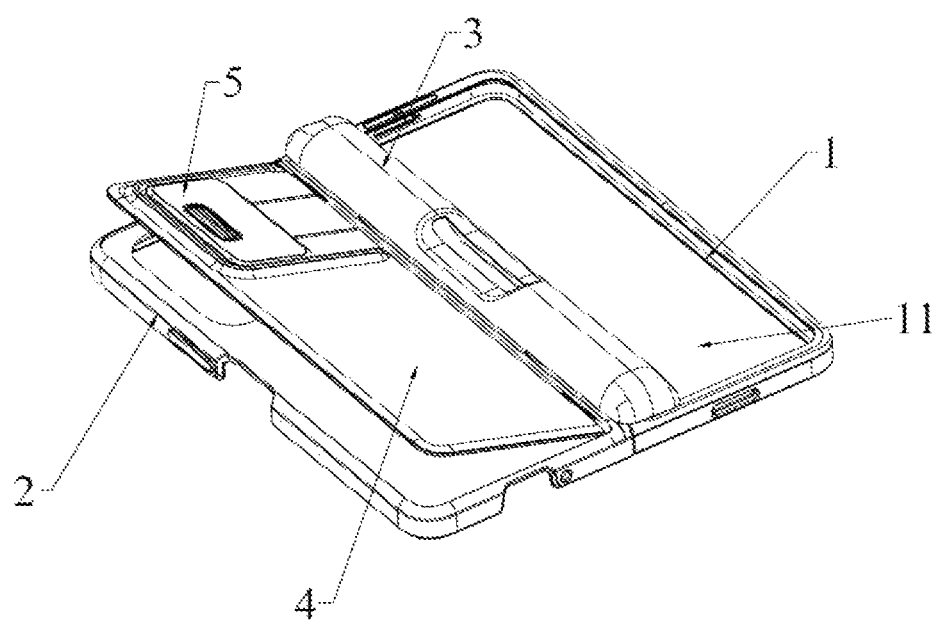
FIG. 5B is a three-dimensional diagram of a foldable-screen phone shell, and also another schematic structural diagram of a side shell body provided with a receiving chamber.

As shown in FIGS. 3 to 5, an outer surface of the shell body 2 is further connected to a support member. The support member includes a bracket plate 4 and a camera cover 5, the bracket plate 4 is rotatably connected to the shell body 2, and an outer surface of the shell body 2 is provided with a bracket accommodating groove 25. When the bracket plate 4 is accommodated in the bracket accommodating groove 25, an outer surface of the bracket plate 4 is flush with the outer surface of the shell body 2, such that when the support member is folded, the use by the user is not affected. The camera cover 5 is slidable by a push with respect to the bracket plate 4 to cover or expose the camera hole 24. For a foldable screen phone, because a phone body is heavy and a conventional support structure has a small force bearing point, the foldable screen phone is likely to incline when supported. As a result, it is difficult to provide a stable support function for the foldable screen phone.

Figure 6:
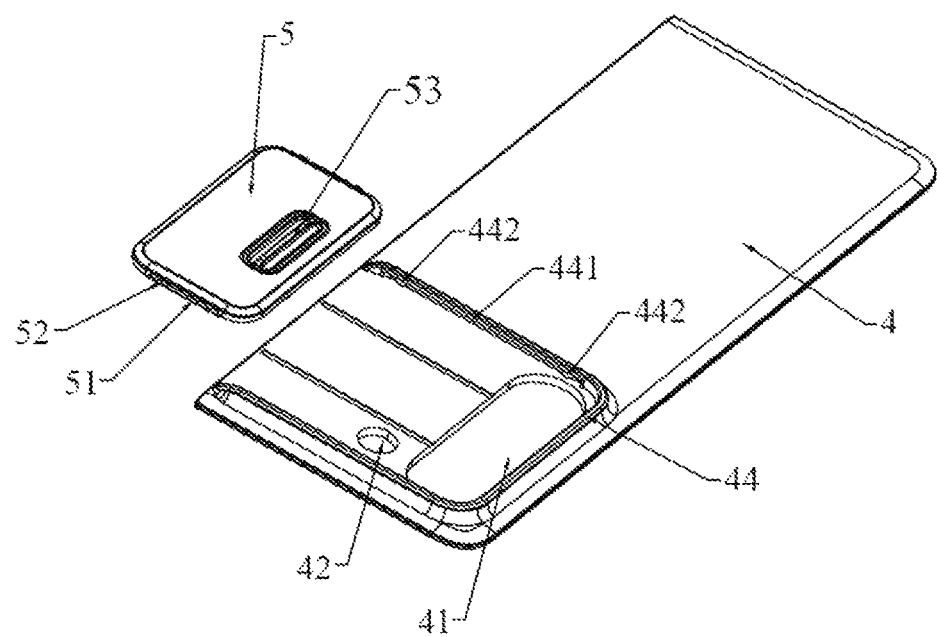
FIG. 6 is a schematic exploded view of a bracket plate and a camera cover.

The external dimension of the bracket plate 4 is arranged to be slightly smaller than that of the shell body 2, and the large-sized bracket plate 4 can provide a stable support force for the foldable screen phone, preventing unstable support from causing the foldable screen phone to incline during use. The bracket plate 4 is provided with a camera exposure hole 41 and a second sound transmission hole 42. When the bracket plate 4 is folded, the camera exposure hole 41 corresponds to the camera hole 24 in position, and the second sound transmission hole 42 corresponds to the sound transmission hole 22 in position. The bracket plate 4 can expose the sound transmission hole 22 and the camera hole 24. Generally, when the user uses the foldable screen phone to read or watch a video, the bracket plate 4 is opened to support the foldable screen phone. To prevent the lens of the camera from being polluted or scratched, the camera of the phone needs to be protected. When the user uses the foldable screen phone to take photos or record audio, the camera or the noise-canceling microphone of the phone needs to be exposed. Because the camera cover 5 is slidably disposed on the bracket plate 4, the user can push the camera cover 5 to slide left or right on the bracket plate 4, so as to selectively expose or cover the camera of the phone. As shown in FIG. 6, when the camera cover 5 is slid to the far right side, the bracket plate 4 exposes the sound transmission hole 22 and the camera hole 24. In this case, the user can use the foldable screen phone to take photos or record audio. When the user does not need to use the function of taking photos or recording audio, the camera cover 5 is slid to the far left side, using the camera cover to completely cover the sound transmission hole 22 and the camera hole 24, thus protecting the camera of the phone and preventing the camera from being polluted or scratched. To conveniently slide the camera cover 5, the outer surface of the camera cover 5 is provided with a push portion 53, and the push portion 53 may be a structure of a groove or a protrusion. During use, the fingers of the user can insert into or grab the push portion 53 for operation on the camera cover 5.

Figure 7:
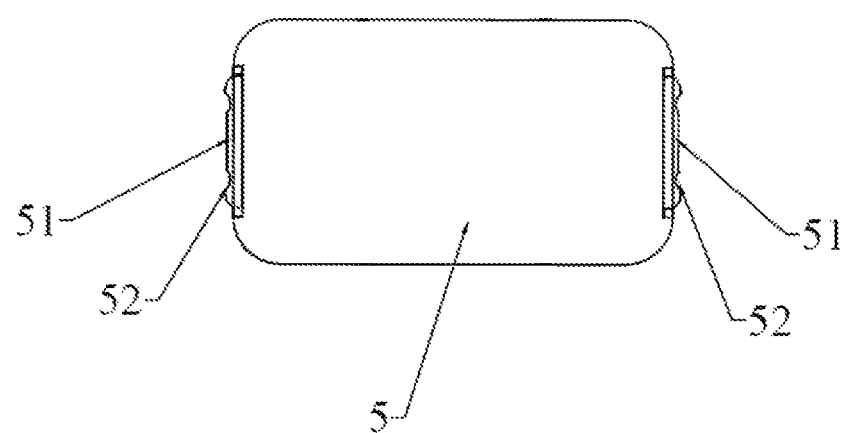
FIG. 7 is a schematic structural diagram of a camera cover.
Figure 8:
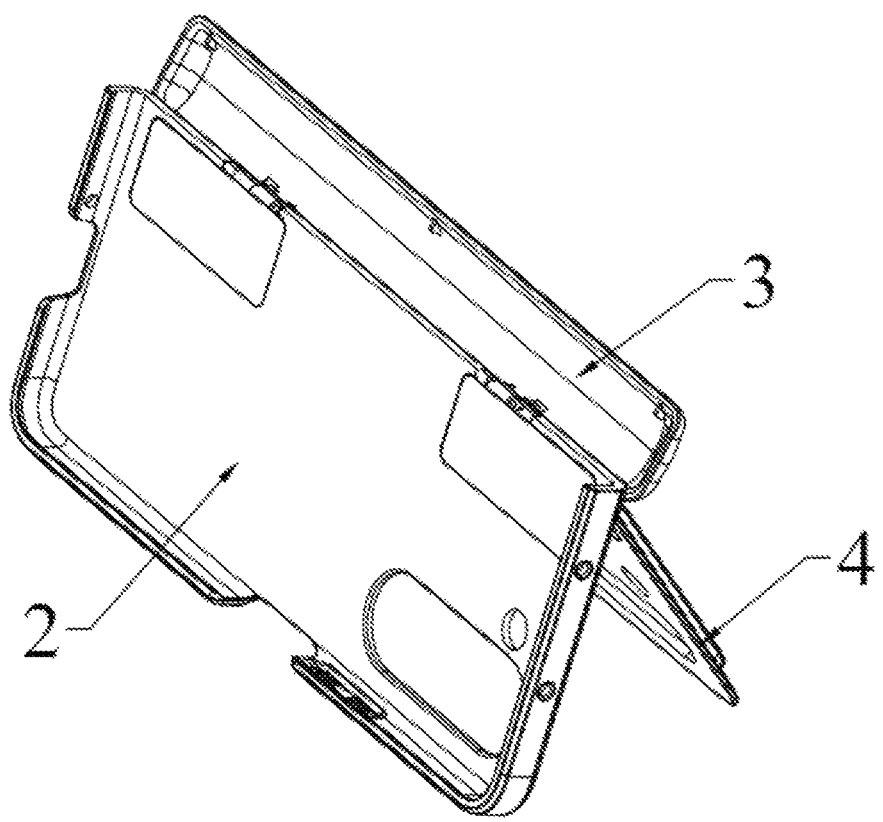
FIG. 8 is a schematic structural diagram of a side shell body and a shell body being rotatably connected.
Figure 9:
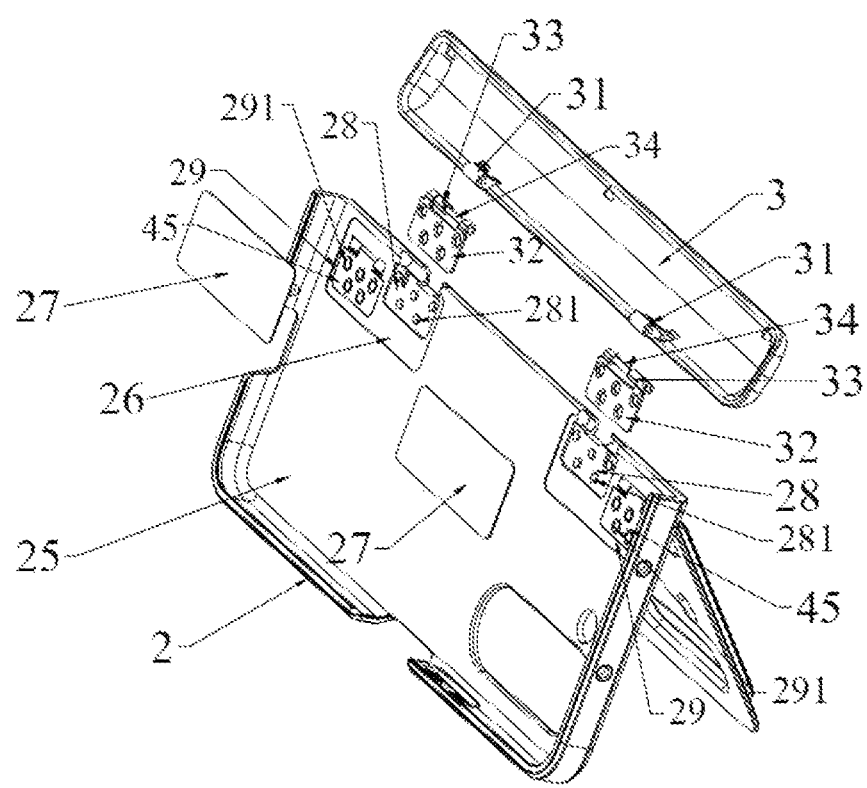
FIG. 9 is a schematic exploded diagram of a side shell body and a shell body being rotatably connected.
Figure 10:
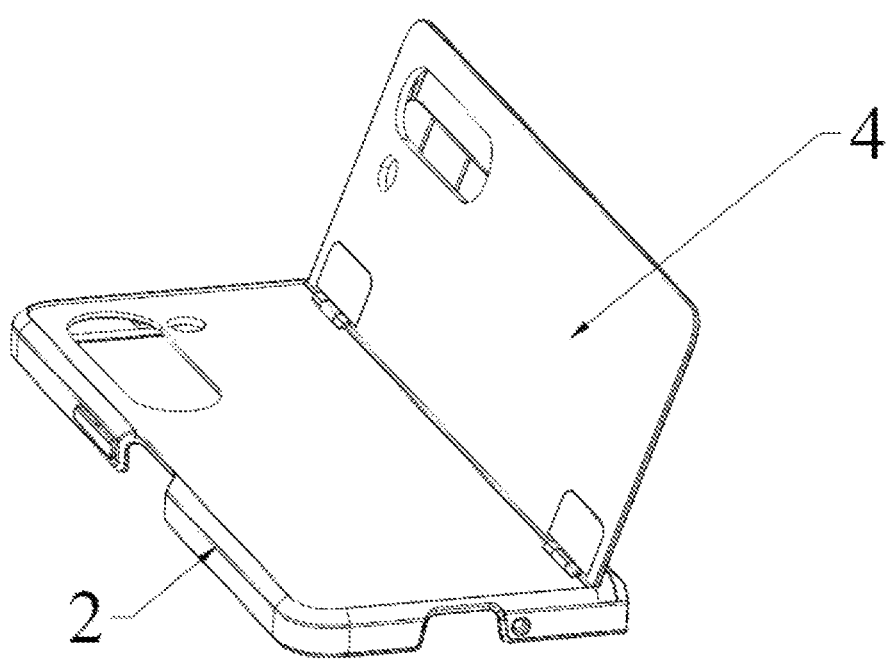
FIG. 10 is a schematic structural diagram of a bracket plate and a shell body being rotatably connected.
Figure 11:
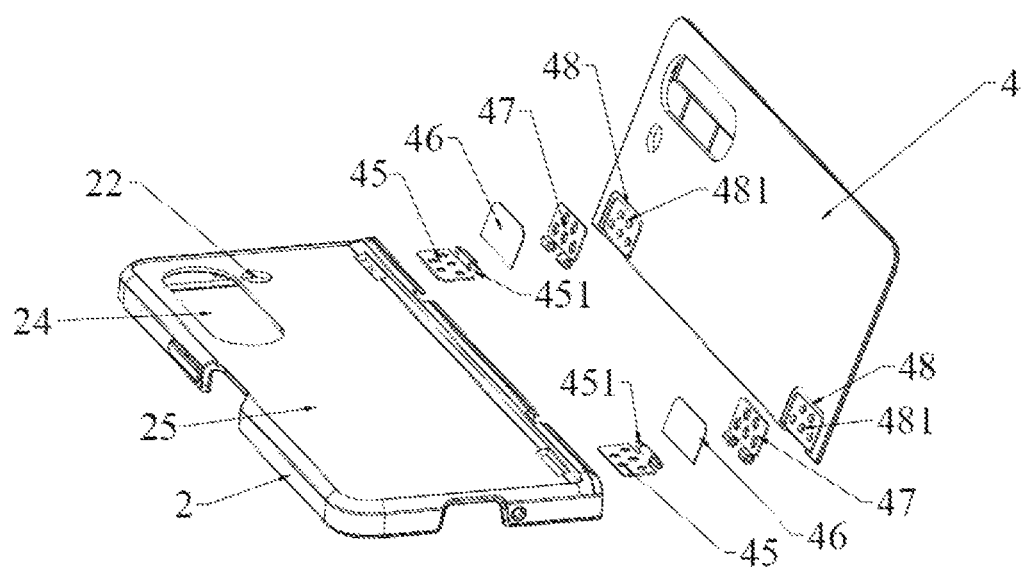
FIG. 11 is a schematic exploded view of a bracket plate and a shell body being rotatably connected.

As shown in FIGS. 6 and 7, the outer surface of the bracket plate 4 is further provided with a U-shaped connecting portion 44. The U-shaped connecting portion 44 protrudes toward the outer side of the bracket plate 4, and the camera cover 5 is slidably connected to the U-shaped connecting portion 44. To conveniently slide the camera cover 5, upper and lower side walls of the U-shaped connecting portion 44 are each provided with a guide groove 441. Correspondingly, upper and lower sides of the camera cover 5 are each provided with a flange 51, and the flange 51 is inserted into the guide groove 441. To prevent the camera cover 5 from arbitrarily sliding on the bracket plate 4, left and right ends of the guide groove 441 are each provided with a limit protruding block 442. Correspondingly, left and right ends of the flange 51 are each provided with a notch 52, and the notch 52 can accommodate the limit protruding block 442. When the camera cover 5 is slid to the far left side, the limit protruding block at the left end of the guide groove 441 is clamped into the left notch of the camera cover 5. When the camera cover 5 is slid to the far right side, the limit protruding block at the right side of the guide groove 441 is clamped into the right notch of the camera cover 5. That is, the fitting between the limit protruding block 442 and the notch 52 limits two extreme positions of the camera cover 5, such that the camera cover 5 stably covers or exposes the camera.

The limit protruding block 442 and the notch 52 may be in different shapes. For example, the limit protruding block 442 may be an arch-shaped protrusion, a semi-circular protrusion, or a wavy protrusion, and the notch 52 correspondingly may be an arch-shaped groove, a semi-circular groove, a wavy groove.

The external dimension of the bracket plate 4 is slightly smaller than that of the shell body 2, and a large bracket plate 4 can provide a stable support force for the foldable screen phone. However, a large-sized bracket plate 4 interferes with the side shell body 3, thus affecting the use by the user. Therefore, it needs to be careful to arrange the bracket plate 4 to be rotatably connected to the shell body 2, satisfying the support performance of the bracket plate 4, not hindering the normal opening and closing of the side shell body 3, and ensuring aesthetics.

As shown in FIGS. 8 to 11, the shell body 2 is rotatably connected to both a side shell body 3 and a bracket plate 4. To mount a hinge structure formed by connecting the side shell body 3 and the bracket plate 4, two hinge accommodating grooves 26 are provided in an inner surface of the shell body 2. The hinge accommodating grooves 26 are used for mounting a first hinge seat 32 hinged with the side shell body 3 and for mounting a second hinge seat 45 hinged with the bracket plate 4. The two hinge accommodating grooves 26 are distributed at upper and lower ends of the shell body 2. Correspondingly, two third hinge grooves 48 are provided in the inner surface of the bracket plate 4, and the two third hinge grooves 48 correspond to the two hinge accommodating grooves 26 in position. A second hinge head 47 is mounted in the third hinge groove 48. The second hinge head 47 is hinged with the second hinge seat 45. Correspondingly, first hinge heads 31 are disposed at upper and lower ends of the side shell body 3, and the first hinge head 31 is hinged with the first hinge seat 32.

In a hinge structure between the first hinge head 31 and the first hinge seat 32, a hinge joint between the first hinge head 31 and the first hinge seat 32 is provided with a pin shaft hole. A first pin shaft 34 may be inserted into the hinge joint between the first hinge head 31 and the first hinge seat 32, achieving rotary connection between the first hinge head 31 and the first hinge seat 32. A torsion spring 33 sleeves a periphery of the first pin shaft 34, and the torsion spring 33 has one end fixedly connected to the first hinge head 31 and the other end fixedly connected to the first hinge seat 32. The torsion spring 33 applies a force to the side shell body 3 to rotate in a close direction. When the phone shell is unfolded, the side shell body 3 is in an open position and in contact with the upper surface of the shell body 2 all the time. When the phone shell is folded, the side shell body 3 is in a close position and in contact with the side wall of the shell body 2 all the time. Thus, when the foldable screen phone is folded or unfolded, the side shell body 3 provides continuous protection for the hinge joint of the phone.

In a hinge structure between the second hinge head 47 and the second hinge seat 45, a hinge joint between the second hinge head 47 and the second hinge seat 45 is provided with a pin shaft hole. A second pin shaft 452 may be inserted into the hinge joint between the second hinge head 47 and the second hinge seat 45, achieving rotary connection between the second hinge head 47 and the second hinge seat 45. To allow the bracket plate 4 to hover at any position within the rotational range, a damping sleeve sleeves the periphery of the second pin shaft 452. The damping sleeve has one end fixedly connected to the second hinge head 47 and the other end fixedly connected to the second hinge seat 45. The damping sleeve increases the rotary friction between the second hinge head 47 and the second hinge seat 45, which is conducive for the user to adjust the support angle of the bracket plate 4 based on the requirements.

To conveniently mount the first hinge seat 32 and the second hinge seat 45, a first hinge groove 28 and a second hinge groove 29 are provided in the hinge accommodating groove 26. A plurality of first positioning protrusions 281 are disposed in the first hinge groove 28, and the plurality of first positioning protrusions 281 are inserted into a positioning hole at a corresponding position of the first hinge seat 32. A plurality of second positioning protrusions 291 are disposed in the second hinge groove 29, and the plurality of second positioning protrusions 291 are inserted into a positioning hole at a corresponding position of the second hinge seat 45.

To conveniently mount the second hinge head 47, a plurality of third positioning protrusions 481 are disposed in the third hinge groove 48, and the plurality of third positioning protrusions 481 are inserted into a positioning hole at a corresponding position of the second hinge head 47.

To prevent the hinge structure from scratching the phone body, after the first hinge seat 32 and the second hinge seat 45 are mounted in the hinge accommodating groove 26, a back cover plate 27 is laid on the hinge accommodating groove 26 and the back cover plate 27 is flush with the inner surface of the shell body 2. To prevent the second hinge head 47 from hindering the bracket plate 4 from being completely accommodated into the bracket accommodating groove 25, after the second hinge head 47 is mounted in the third hinge groove 48, a bracket cover plate 46 is laid on the third hinge groove 48, and the bracket cover plate 46 is flush with the inner surface of the bracket plate 4.

Embodiment 2

This embodiment provides an electronic-device protective shell and is different from Embodiment 1 in that this electronic device is a flat screen phone. The electronic device has a protective shell including a shell body 2. The shell body 2 is provided with an accommodating chamber and a sound transmission hole 22 and a camera hole 24 in communication with the accommodating chamber, the accommodating chamber being used for accommodating the body of the flat screen phone. A sound transmission hole 22 is provided on a side of the camera hole 24. The sound transmission hole 22 during use is aligned with a noise-canceling microphone on the flat screen phone. The camera hole 24 during use is aligned with the camera on the flat screen phone and used for exposing the camera of the flat screen phone. A button portion 21 is disposed on a side of the shell body 2, and its bottom is provided with a data cable socket 23.

An outer surface of the shell body 2 is further connected to a support member. The support member includes a bracket plate 4 and a camera cover 5, the bracket plate 4 is rotatably connected to the shell body 2, and an outer surface of the shell body 2 is provided with a bracket accommodating groove 25. When the bracket plate 4 is accommodated in the bracket accommodating groove 25, an outer surface of the bracket plate 4 is flush with the outer surface of the shell body 2, such that when the support member is folded, the use by the user is not affected. The camera cover 5 is slidable by a push with respect to the bracket plate 4 to cover or expose the camera hole 24.

The external dimension of the bracket plate 4 is arranged to be slightly smaller than that of the shell body 2, and the large-sized bracket plate 4 can provide a stable support force for the flat screen phone, preventing unstable support from causing the flat screen phone to incline during use. The bracket plate 4 is provided with a camera exposure hole 41 and a second sound transmission hole 42. When the bracket plate 4 is folded, the camera exposure hole 41 corresponds to the camera hole 24 in position, and the second sound transmission hole 42 corresponds to the sound transmission hole 22 in position. The bracket plate 4 can expose the camera hole 24. Generally, when the user uses the flat screen phone to read or watch a video, the bracket plate 4 is opened to support the flat screen phone. To prevent the lens of the camera from being polluted or scratched, the camera of the phone needs to be protected. When the user uses the flat screen phone to take photos or record audio, the camera or the noise-canceling microphone of the phone needs to be exposed. Because the camera cover 5 is slidably disposed on the bracket plate 4, the user can slide the camera cover 5 left or right on the bracket plate 4, so as to selectively expose or cover the camera of the phone. When the camera cover 5 is slid to the far right side, the bracket plate 4 exposes the sound transmission hole 22 and the camera hole 24. In this case, the user can use the flat screen phone to take photos or record audio. When the user does not need to use the function of taking photos or recording audio, the camera cover 5 is slid to the far left side. In this case, the camera cover of the bracket plate 4 completely covers the sound transmission hole 22 and the camera hole 24, thus protecting the camera of the phone and preventing it from being polluted or scratched.

Embodiment 3

Figure 12:
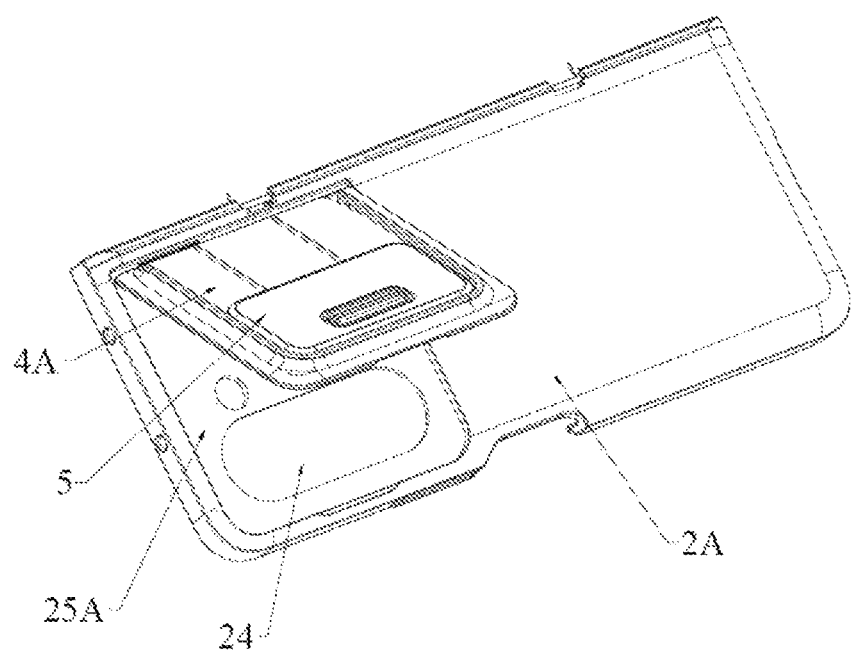
FIG. 12 is a schematic structural diagram of a second bracket plate and a second shell body according to another embodiment.

This embodiment provides an electronic-device protective shell and is different from Embodiment 1 in that as shown in FIG. 12, an external dimension of a second bracket plate 4A is arranged as a partial region covering a second shell body 2A. For example, a long edge of the second bracket plate 4A is roughly equal to ⅓ of a long edge of the second shell body 2A, and a short edge of the second bracket plate 4A is slightly smaller than that of the second shell body 2A. Correspondingly, an outer surface of the second shell body 2A is provided with a second bracket accommodating groove 25A. When the second bracket plate 4A is accommodated in the second bracket accommodating groove 25A, the outer surface of the second bracket plate 4A is flush with the outer surface of the second shell body 2A, such that when the support member is folded, the use by the user is not affected.

The second bracket plate 4A and the camera cover 5 are used as the support member of the second shell body 2A, the camera cover 5 is slidable with respect to the second bracket plate 4A, and the camera cover 5 is pushed to cover or expose the camera hole 24.

It should be noted that relational terms such as "first" and "second" are only adopted to distinguish one entity or operation from another entity or operation, and are not necessarily required or implied that there is any such actual relationship or order between these entities or operations. The content not detailed in this specification belongs to the prior art known to those skilled in the art.

The above descriptions are merely the preferred embodiments of the present invention and do not limit the present invention in any form. Persons of ordinary skill in the art can smoothly implement the present invention according to the accompanying drawings in this specification and the foregoing descriptions. However, any equivalent changes made by those skilled in the art, such as slight replacements, modifications, and evolutions, within the scope of the technical solution of the present invention based on the foregoing disclosed technical content, are all considered equivalent embodiments of the present invention. In addition, any equivalently changeable replacements, modifications, and evolutions made to the foregoing embodiments based on the essential technology of the present invention still fall within the protection scope of the technical solution of the present invention.

What is claimed is:

1. An electronic-device protective shell, comprising: a shell body, wherein the shell body is provided with an accommodating chamber and a camera hole in communication with the accommodating chamber, the accommodating chamber is used for accommodating an electronic device, and the camera hole is used for exposing a camera of the electronic device, wherein
    an outer surface of the shell body is connected to a support member, the support member comprises a bracket plate and a camera cover, the bracket plate is rotatably connected to the shell body, and an external dimension of the bracket plate is slightly smaller than that of the shell body; an outer surface of the shell body is provided with a bracket accommodating groove, and when the bracket plate is accommodated in the bracket accommodating groove, an outer surface of the bracket plate is flush with the outer surface of the shell body; and the camera cover is slidable by a push with respect to the bracket plate to cover or expose the camera hole; wherein the bracket plate is provided with a camera exposure hole, and the camera exposure hole corresponds to the camera hole in position; and
    the outer surface of the bracket plate is provided with a U-shaped connecting portion, the camera cover is slidably connected to the U-shaped connecting portion, upper and lower side walls of the U-shaped connecting portion are each provided with a guide groove, and left and right ends of the guide groove are each provided with a limit protruding block; and upper and lower sides of the camera cover are each provided with a flange, left and right ends of the flange are each provided with a notch, the flange is inserted into the guide groove, and the notch is configured to accommodate the limit protruding block.

2. The electronic-device protective shell according to claim 1, wherein the limit protruding block is a semi-circular protrusion, and the notch is a semi-circular groove.

3. The electronic-device protective shell according to claim 1, wherein a side shell body is provided with a receiving chamber, and a stylus is able to be placed in the receiving chamber on the side shell body.

4. The electronic-device protective shell according to claim 1, wherein the electronic device is a foldable screen phone, the foldable screen phone comprises an upper folded portion comprising a first screen and a lower folded portion comprising a second screen, the upper folded portion is connected to the lower folded portion via a hinge, and the shell body is configured to accommodate the lower folded portion of the foldable screen phone; and the protective shell further comprises a front protective shell and a side shell body, wherein the front protective shell is configured to accommodate the upper folded portion of the foldable screen phone, and the front protective shell is provided with a hollow window; and the side shell body is able to be rotatably opened or closed with respect to the shell body.

5. The electronic-device protective shell according to claim 4, wherein an inner surface of the shell body is provided with two hinge accommodating grooves, and the two hinge accommodating grooves are distributed at upper and lower ends of the shell body; an inner surface of the bracket plate is provided with two third hinge grooves, and the two third hinge grooves correspond to the two hinge accommodating grooves; a second hinge head is mounted in the third hinge groove, a second hinge seat is mounted in the hinge accommodating groove, and the second hinge head is hinged with the second hinge seat; and a back cover plate is laid on the hinge accommodating groove, and a bracket cover plate is laid on the third hinge groove.

6. The electronic-device protective shell according to claim 5, wherein a second pin shaft is inserted into a hinge joint between the second hinge head and the second hinge seat, a damping sleeve sleeves a periphery of the second pin shaft, and the damping sleeve has one end fixedly connected to the second hinge head and the other end fixedly connected to the second hinge seat.

7. The electronic-device protective shell according to claim 5, wherein a first hinge seat is also mounted in the hinge accommodating groove, upper and lower ends of the side shell body are each provided with a first hinge head, and the first hinge head is hinged with the first hinge seat; a first pin shaft is inserted into a hinge joint between the first hinge head and the first hinge seat, a torsion spring sleeves a periphery of the first pin shaft, and the torsion spring has one end fixedly connected to the first hinge head and the other end fixedly connected to first hinge seat; and the torsion spring applies a force to the side shell body to rotate in a close direction.

8. The electronic-device protective shell according to claim 5, wherein a first hinge groove and a second hinge groove are provided in the hinge accommodating groove; wherein a plurality of first positioning protrusions are disposed in the first hinge groove, and the plurality of first positioning protrusions are inserted into a positioning hole at a corresponding position of the first hinge seat; and a plurality of second positioning protrusions are disposed in the second hinge groove, and the plurality of second positioning protrusions are inserted into a positioning hole at a corresponding position of the second hinge seat; and a plurality of third positioning protrusions are disposed in the third hinge groove, and the plurality of third positioning protrusions are inserted into a positioning hole at a corresponding position of the second hinge head.

9. The electronic-device protective shell according to claim 5, wherein a side of the shell body is provided with a button portion, a bottom of the shell body is provided with a data cable socket, and a side of the camera hole is provided with a first sound transmission hole.

* * * * *